UNITED STATES PATENT OFFICE.

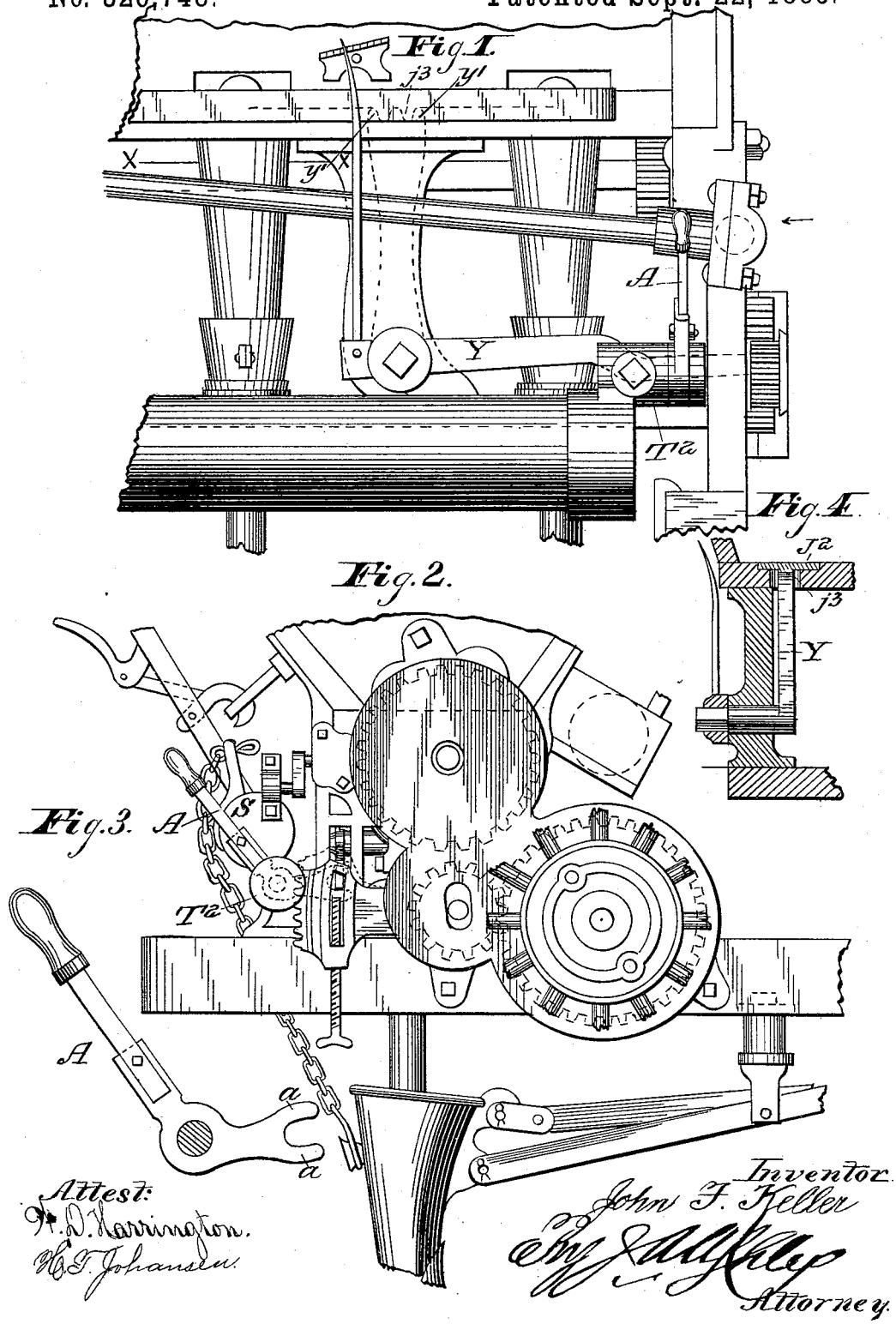

JOHN F. KELLER, OF SHEPHERDSTOWN, WEST VIRGINIA.

GRAIN-DRILL.

SPECIFICATION forming part of Letters Patent No. 326,748, dated September 22, 1885.

Application filed June 15, 1885. (No model.)

*To all whom it may concern:*

Be it known that I, JOHN F. KELLER, a citizen of the United States, residing at Shepherdstown, in the county of Jefferson and State of West Virginia, have invented a new and useful Improvement in Grain-Drills, of which the following is a description.

The invention relates generally to that class of grain-drills which are provided with two distinct hoppers, one for the reception and discharge of seeds and the other for the reception and discharge of guano, or other comminuted fertilizing material, each being provided with mechanism for facilitating and regulating the outflow; and it relates particularly to an improvement in the fertilizer-discharging mechanism.

In United States Patent No. 318,478, issued to me on the 26th day of May, 1885, I described, among other improvements in a grain-drill of the character above indicated, an improved mechanism, whereby the discharge-orifices in the bottom of the fertilizer-hopper are varied in their dimensions, being regulated and adjusted according to the condition and requirements of the soil to which the fertilizer is to be supplied. In that patent I described and claimed the combination, in a grain-drill, of a hopper which is mounted upon the frame of the drill, a series of discharge-openings in the bottom of the hopper, an independent non-discharging opening in the bottom of the hopper, a regulating slide for controlling the discharge-openings, downwardly-extending projections corresponding to the independent opening upon the bottom of the regulating slide, a lever which is secured to the drill, projections upon the upper end of the lever, and an adjusting screw which is connected to the lever or is brought into contact therewith to actuate the same. The mechanism thus indicated adapts the machine to discharge within certain limits any desired quantity of fertilizing material per acre, the rate of discharge when the adjustment of the slides has been effected being regular and unvaried throughout all parts of the field. Under all conditions in which it is desired to accomplish this uniform discharge the mechanism referred to has been employed with entirely satisfactory results. Under some circumstances, however, as when the drill is passing over an unusually sterile portion of the field, it is desirable for a brief period to increase the flow of the fertilizing material, so that while the machine may be passing over a space but a few yards in extent a larger quantity may be discharged. To accomplish this without changing the adjustment of the adjusting-screw is the object of this improvement; and the invention consists in the combination, with a discharging mechanism, under the ordinary operation of which the outflow is continuous and uniform, of a means whereby the outflow may be instantly increased in volume and then may with equal facility and celerity be restored to its former regulated rate of discharge.

In the drawings, Figure 1 is a rear elevation of a portion of a grain-drill to which my improvement is applied. Fig. 2 is a side elevation of a similar portion of a grain-drill, looking in the direction of the arrow seen in Fig. 1. Fig. 3 is a side elevation of the bifurcated lever. Fig. 4 is a partial vertical section drawn to a diminished scale on the line $x$ of Fig. 1.

To enable the operator to enlarge the discharge-orifices without using the regulating mechanism, a handled lever, A, having bifurcations $a\,a$, is pivoted upon the eccentric pinion $T^2$ of the lifting-bar S in such a manner as to engage by its bifurcations the horizontal portion of the elbow-lever Y. An outward and downward movement of the handle of the lever A serves to elevate the right extremity of the horizontal portion of the lever Y, and to depress the left extremity thereof, thereby moving the regulating-slide $J^2$ in the bottom of the hopper toward the left, and thus increasing the discharging capacity of the orifices. The teeth $y'$ upon the upper extremity of the lever Y, being at all times in engagement with the downwardly-extending projections $j^3$ upon the bottom surface of the slide $J^2$, a reverse movement of the lever A instantly restores the slide to the adjustment which had before been effected. This instant change in the rate of discharge, and the instant return to the original rate of discharge, will be effected without in the least checking the movement of the machine in its progress across the field.

Having described my invention, I claim—

1. The combination, with a fertilizer-distributing hopper, of a regulating-slide for controlling the discharge-openings, an elbow-lever which engages with the regulating-slide, an adjusting-screw which engages with the elbow-lever to adjust the slide, and a lever which engages the elbow-lever and operates independently of the slide-adjusting mechanism either to increase the area of the discharge-openings or to restore them to the dimensions to which they had originally been adjusted.

2. In a grain-drill and fertilizer-distributer, the combination, with a discharging mechanism under the ordinary operation of which the outflow is continuous and uniform, of a means, substantially as described, whereby the outflow may be instantly increased in volume and then with equal facility and celerity may be restored to its former regulated rate of discharge.

JOHN F. KELLER.

Witnesses:
W. P. LICKLIDER,
G. T. LICKLIDER.